US012589682B2

(12) United States Patent  (10) Patent No.: US 12,589,682 B2
Furuta  (45) Date of Patent: Mar. 31, 2026

(54) VEHICLE CONTROL DEVICE

(71) Applicant: TOYOTA JIDOSHA KABUSHIKI KAISHA, Toyota (JP)

(72) Inventor: Hiroki Furuta, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 18/441,126

(22) Filed: Feb. 14, 2024

(65) Prior Publication Data

US 2024/0416809 A1  Dec. 19, 2024

(30) Foreign Application Priority Data

Apr. 14, 2023  (JP) .................................. 2023-066291

(51) Int. Cl.
*B60N 2/50* (2006.01)
*B60N 2/00* (2006.01)
(52) U.S. Cl.
CPC ............. *B60N 2/501* (2013.01); *B60N 2/502* (2013.01); *B60N 2/0021* (2023.08)
(58) Field of Classification Search
None
See application file for complete search history.

(56) References Cited

U.S. PATENT DOCUMENTS

| 2006/0261647 A1 | 11/2006 | Maas et al. | |
| 2019/0184867 A1* | 6/2019 | Ketels | B60N 2/502 |
| 2020/0122607 A1* | 4/2020 | Sugimura | B60W 30/10 |
| 2020/0238876 A1 | 7/2020 | Dhaens | |
| 2022/0314725 A1 | 10/2022 | Kuretake | |
| 2025/0018835 A1* | 1/2025 | Gempel | B60N 2/002 |

FOREIGN PATENT DOCUMENTS

| JP | 2006-509673 A | 3/2006 |
| JP | 2022-158441 A | 10/2022 |

* cited by examiner

*Primary Examiner* — Lail A Kleinman
(74) *Attorney, Agent, or Firm* — SoraIP, Inc.

(57) ABSTRACT

The present disclosure includes: a carrier member on which an occupant sits or lies; an active suspension disposed between the carrier member and a vehicle body; a state detection device configured to detect state information that is information on current or future acceleration applied to the carrier member; a controller configured to control the active suspension based on the state information to change a carrier attitude; and an occupant information acquisition device configured to acquire occupant information that is information on an abnormality of a body of an occupant on the carrier member/The controller is configured to correct a controlled variable of the carrier attitude by the active suspension based on the state information and the occupant information.

4 Claims, 3 Drawing Sheets

UP

FRONT ←→ REAR

DOWN

AFFECTED AREA

☐ HEAD

■ INTERNAL ORGAN

FIG. 3

START

S1 ACQUIRE OCCUPANT INFORMATION

S2 SELECT ATTITUDE CONTROL

S3 PERFORM ATTITUDE CONTROL

END

FRONT ← → REAR

DOWN

VEHICLE CONTROL DEVICE

CROSS-REFERENCE TO RELATED APPLICATION

This application claims priority to Japanese Patent Application No. 2023-066291 filed on Apr. 14, 2023, incorporated herein by reference in its entirety.

BACKGROUND

1. Technical Field

The present disclosure relates to vehicle control devices that control an active suspension.

2. Description of Related Art

In order to reduce vibration of a seat of a vehicle, an active suspension is sometimes disposed between the seat and a vehicle body of the vehicle. The active suspension is configured to control the force that acts between the seat and the vehicle body. A controller controls the active suspension so that vibration of the seat is reduced with respect to vibration input to the seat. For example, Japanese Unexamined Patent Application Publication (Translation of PCT Application) No. 2006-509673 (JP 2006-509673 A) describes an active suspension provided under a seat and having two degrees of freedom of movement.

SUMMARY

From the standpoint of occupant's comfort, the vehicle control device controls the active suspension so as to reduce changes in attitude of an occupant on the seat. For example, when the attitude of the vehicle changes toward one side in the roll direction, the vehicle control device changes the attitude of the seat toward the other side in the roll direction by the active suspension. When the attitude of the vehicle changes toward one side in the pitch direction, the vehicle control device changes the attitude of the seat toward the other side in the pitch direction by the active suspension. The vehicle control device attempts to reduce the longitudinal and lateral accelerations applied to the occupant by changing the attitude of the seat.

In conventional configurations, when an occupant on a carrier member such as a seat or bed is not in a good physical condition, an attitude control that is performed on the active suspension does not consider the occupant's physical condition. The conventional configurations have room for improvement in this respect.

It is an object of the present disclosure to provide a vehicle control device that can perform an attitude control according to the physical condition of an occupant and whether the occupant is injured.

A vehicle control device of the present disclosure includes: a carrier member that is mounted in a vehicle so as to be movable relative to a vehicle body and on which an occupant sits or lies; an active suspension disposed between the carrier member and the vehicle body and configured to change a carrier attitude that is a relative attitude of the carrier member with respect to the vehicle body; a state detection device configured to detect state information that is information on current or future acceleration applied to the carrier member; a controller configured to control the active suspension based on the state information to change the carrier attitude; and an occupant information acquisition device configured to acquire occupant information that is information on an abnormality of a body of the occupant on the carrier member. The controller is configured to correct a controlled variable of the carrier attitude by the active suspension based on the state information and the occupant information.

According to the present disclosure, the controlled variable is corrected based on the occupant information. It is therefore possible to perform an attitude control according to the physical condition of an occupant and whether the occupant is injured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating an example of control according to the embodiment;

FIG. 4 is a block diagram of another embodiment of the embodiment; and

DETAILED DESCRIPTION OF EMBODIMENTS

Hereinafter, as a mode for carrying out the present disclosure, a vehicle control device 1 which is one embodiment of the present disclosure will be described in detail with reference to the drawings. Besides the following embodiments, the disclosure can be carried out in various forms in which various modifications and improvements are made based on the knowledge of those skilled in the art. In the vehicle of this embodiment, wheels 8 are arranged on the front, rear, left and right sides.

Figures 1, 2:
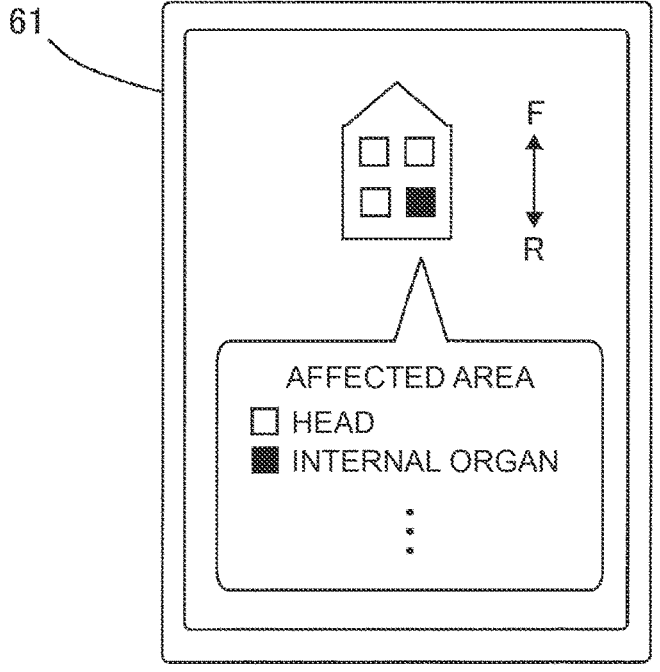
FIG. 1 is a configuration diagram of a vehicle control device according to an embodiment.
FIG. 2 is a conceptual diagram of an example of an input terminal according to the embodiment.

As shown in FIG. 1, the vehicle control device 1 includes a seat 2 as a carrier member, an active suspension 3, a state detection device 4, a controller 5, and an occupant information acquisition device 6. The carrier member is a member that is mounted on the vehicle so as to be movable relative to the vehicle body 10, and on which the occupant sits or lies. In this embodiment, the carrier member is the seat 2. The seat 2 includes a seat member 21 on which an occupant sits, a backrest member 22, and a headrest 23. The backrest member (seatback) 22 extends upward from the seat member 21 so as to support the back of an occupant seated on the seat member 21. The headrest 23 extends upward from the backrest member 22 so as to support the head of an occupant seated on the seat member 21. In addition to the seat 2, the carrier member may be, for example, a bed on which an occupant lies in a vehicle (such as an ambulance), or a stretcher frame for fixing a stretcher in a vehicle.

The active suspension 3 is arranged between the seat 2 and the vehicle body 10. The active suspension 3 is installed, for example, on a bottom forming member of the vehicle body 10. The active suspension 3 includes a plurality of actuators 33 that change the seat attitude (corresponding to a "carrier attitude"), which is the relative attitude of the seat 2 with respect to the vehicle body 10, and the relative position in the vertical direction. The active suspension 3 is configured to be able to control the force acting between the seat 2 and the vehicle body 10. The active suspension 3 may be configured to be able to control the damping force between the vehicle body 10 and the seat 2 and/or the spring constant (elastic force) between the vehicle body 10 and the seat 2 in addition to controlling the seat attitude and position. The seat 2 connected to the active suspension 3 is also called an active seat.

To conceptually explain an example of the active suspension 3, the active suspension 3 includes a shock absorber 31 as a damper element, a suspension spring 32 as a spring element, and a plurality of actuators 33. The plurality of actuators 33 are configured to be able to change the relative position of the seat 2 with respect to the vehicle body 10 in the vertical direction, the relative attitude in the roll direction, and the relative attitude in the pitch direction.

In this embodiment, at least three actuators 33 are installed spaced apart from each other on one seat 2, that is, on one active suspension 3. For example, three actuators 33 installed in parallel and spaced apart from each other for one seat 2 can move the seat 2 in the vertical direction (heave direction), and change the seat attitude in the roll direction and/or pitch direction. According to the three actuators 33, the seat 2 can be tilted, and it is possible to cope with shaking in the roll direction and shaking in the pitch direction. Each actuator 33 includes an electric motor as a drive source and a speed reduction mechanism. Note that the drive source for the actuator 33 may be, for example, a hydraulic drive source.

The shock absorber 31 generates a damping force between the vehicle body 10 and the seat 2. The shock absorber 31 may be a variable type in which the damping force (damping coefficient or damping ratio may be used) can be changed, or a non-variable type in which the damping force (damping coefficient or damping ratio) cannot be changed. The suspension spring 32 generates an elastic force between the vehicle body 10 and the seat 2 according to a spring constant. The suspension spring 32 may have a variable spring constant or a non-variable spring constant.

The state detection device 4 is a device that detects state information that is information regarding current or future acceleration occurring in the seat 2. The state information, that is, the state of the seat 2, can be expressed by, for example, acceleration, velocity, or displacement. If the amount of displacement at least three positions of the seat 2 can be calculated, the attitude of the seat 2 can be grasped.

The state detection device 4 of this embodiment includes three acceleration sensors 41, 42, and 43 that detect acceleration in the vertical direction. The three acceleration sensors 41 to 43 are installed on the seat 2 at a distance from each other. For example, the acceleration sensor 41 is located at the front right portion of the bottom surface of the seat 2, the acceleration sensor 42 is located at the front left portion of the bottom surface of the seat 2 (seat surface member 21 to be described later), and the acceleration sensor 43 is located at the rear right portion of the bottom surface of the seat 2. It is installed on the left rear part.

At least three acceleration sensors 41 to 43 are installed on the seat 2, and by regarding the seat 2 as a rigid body, it is possible to calculate the state quantity (for example, displacement amount and attitude) of an arbitrary plane of the seat 2. The first-order time integral value of acceleration is the velocity, and the second-order time integral value of acceleration is the displacement amount. In this way, the state detection device 4 of this embodiment detects information regarding the current acceleration (acceleration, velocity, or displacement amount) occurring at the three positions of the seat 2.

The controller 5 is configured by an electronic control unit (ECU) including one or more processors 51 and one or more memories 52. The memory 52 is communicatively connected to the processor 51. Memory 52 may be internal or external memory. The controller 5 is communicably connected to the active suspension 3 and the state detection device 4. For example, when the seating sensor 2a that determines whether an occupant is seated on the seat 2 determines that an occupant is present, the controller 5 controls the active suspension 3 corresponding to the seat 2 determined to be occupied. The seating sensor 2a is one of the occupant detection sensors that detect an occupant on the carrier member, and is, for example, a load sensor or a capacitive sensor.

The controller 5 controls the active suspension 3 based on the detection result of the state detection device 4, that is, the state information. The controller 5 changes the seat attitude in at least one of the roll direction and the pitch direction based on the state information. The controller 5 can also move the seat 2 in the vertical direction. The controller 5 controls the active suspension 3 to reduce vibrations of the seat 2 and changes in the attitude of the occupant. Hereinafter, this control will be referred to as normal vibration damping control. In the normal vibration damping control, the seat attitude is controlled so as to reduce the front, rear, left, and right accelerations that are applied to the occupant due to, for example, the tilt of the vehicle. Normal damping control can also be called normal attitude control. The controller 5 also takes into account the influence of the undercarriage suspension 7 provided on each wheel 8 on the vehicle body 10 and performs a normal vibration damping control.

The controller 5 controls the three actuators 33 to control the vertical position, roll direction attitude, and pitch direction attitude of the seat 2. The controller 5 sets the current value of the control current supplied to each actuator 33. The controller 5 supplies a control current to the electric motor of each actuator 33 via a corresponding drive circuit (not shown). The current value of the control current correlates with the amount of expansion and contraction of the actuator 33. The amount of expansion and contraction of the actuator 33, that is, the amount of displacement of the corresponding portion of the seat 2 due to the operation of the actuator 33, can also be said to be the controlled variable of the actuator 33. As normal vibration damping control, the controller 5 performs feedback control based on the detected values of the acceleration sensors 41 to 43 so that each detected value approaches a target value, for example.

The occupant information acquisition device 6 is a device that acquires occupant information that is information regarding abnormalities in the body of the occupant on the seat 2. The occupant information acquisition device 6 includes an input terminal 61 that can be operated by the occupant. The input terminal 61 is, for example, a touch panel tablet, a remote controller with a button switch, or the like. An input terminal 61 is provided on each seat 2. Each input terminal 61 transmits input information to the controller 5 as occupant information on the corresponding seat 2. The input terminal 61 has preset options for an area of injury or illness (hereinafter referred to as affected area). Options for the affected area include, for example, the head, arms, legs, and internal organs (visceral system). When the input terminal 61 is operated and the affected area is selected from the options, the controller 5 determines that the occupant has an abnormality and the affected area is the area of the selected option. When no option is selected from the options (when the input terminal 61 is not operated), the controller 5 determines that there is no abnormality in the occupant.

The input terminal 61 may be preset with options related to medical conditions of the affected area (for example, headache, abdominal pain, bruises, bone fractures, etc.). Furthermore, the input terminal 61 may be one common terminal for a plurality of seats 2. In this case, for example, as shown in FIG. 2, options for selecting which seat 2 the occupant information belongs to (options for the position of the seat 2 to which the occupant information is applicable) may be set in advance. For example, in the case of FIG. 2, options are displayed on the screen of a tablet terminal capable of wireless communication, and the screen is touched to select the position of the occupant (seat 2) and the affected area (filled in black) (options are selected).

The input terminal 61 or the controller 5 may determine which seat 2 the occupant information belongs to based on the detection result of the seating sensor 2a. For example, if the input terminal 61 is a common terminal as shown in FIG. 2, only the seats 2 whose occupants have been detected by the seating sensor 2a may be displayed as options on the input terminal 61. When a plurality of carrier members (seats 2 in this case) is mounted on the vehicle, the controller 5 identifies the carrier member on which the occupant is seated or sleeping. When there is only one carrier member, there is no need to specify the carrier member.

Further, the controller 5 may receive occupant information from a computer in another facility (for example, a hospital, etc.) via wireless communication. The controller 5 may obtain occupant information in advance via the network. For example, the controller 5 of an ambulance or a taxi may acquire from a hospital etc. occupant information (patient information) on a patient who is or is going to ride in the ambulance or taxi. The controller 5 may function as the occupant information acquisition device 6. In this way, the controller 5 or the input terminal 61 can acquire information such as abnormalities of the occupant by manual input or automatic input.

Correction of Controlled Variable: Abnormality Vibration Damping Control

The controller 5 corrects the controlled variable of the carrier attitude by the active suspension 3 based on the state information and the occupant information. The controller 5 corrects the controlled variable by correcting the gain in the calculation of the controlled variable. The controller 5 is set with attitude control suitable for a frequency band that is effective to reduce (hereinafter also referred to as a "reduction target frequency band") for each affected area of the occupant. In addition, when the affected area and the medical condition of the occupant are registered as a set in the controller 5, attitude control may be set in the controller 5 for each set.

For example, when the affected area of the occupant is the head, it is effective to reduce vibrations at a relatively low frequency (for example, around 1 Hz), which is the head resonance frequency, in order to prevent the head from shaking as much as possible. Conceivable. Therefore, when the affected area of the occupant is the head, the frequency band to be reduced is a low frequency band. Furthermore, for example, when the affected area of the occupant is an internal organ, it is considered effective to reduce vibrations at medium frequencies (for example, 4 to 8 Hz), which are the resonance frequency of the internal organ, in order to prevent the internal organs from shaking as much as possible. Therefore, when the affected area of the occupant is an internal organ, the frequency band to be reduced is a medium frequency band. Attitude control suitable for the frequency band to be reduced is set in the controller 5 based on knowledge of the resonance frequencies of other affected areas (for example, legs, arms, etc.).

In this way, abnormal vibration damping control, which is attitude control (control law and/or gain) for when an abnormality occurs in the occupant, is preset in the controller 5 for each assumed frequency band to be reduced (or for each affected area). In the controller 5, a head care control to be performed when the frequency band to be reduced is a low frequency band (that is, when the affected area is a head), and an internal organ care control to be performed when the frequency band to be reduced is a medium frequency band (that is, when the affected area is an internal organ), etc. are set in advance as vibration damping control in abnormal situations.

When the controller 5 acquires occupant information indicating that the occupant has an affected area, the controller 5 switches the control for the active suspension 3 of the seat 2 corresponding to the occupant information from normal vibration damping control to abnormal vibration damping control corresponding to the affected area. For example, when the controller 5 acquires occupant information indicating that the affected area of the occupant in the left front seat 2 is the head, the controller 5 switches the control of the active suspension 3 of the left front seat 2 from the normal vibration damping control to the head care control.

In this way, the controller 5 is preset with a control law, gain setting, and/or a combination thereof that can reduce vibration in the frequency band to be reduced as abnormal vibration damping control corresponding to the affected area. In abnormal vibration damping control, for example, among the control laws of normal vibration damping control, the gain that can reduce vibrations in the frequency band to be reduced is set to a larger value than normal vibration damping control, and the vibration in the frequency band to be reduced increases. The gain that causes vibration is set to a smaller value than normal vibration damping control. In abnormal vibration damping control, compared to normal vibration damping control, the gain of the control term that has a damping effect on the frequency band to be reduced is increased, and the control has an excitation effect on the frequency band to be reduced. The gain of the term is decreasing.

The active suspension 3 is arranged between the seat 2, which is a sprung structure, and the vehicle body 10, which is an unsprung structure. The control term can be said to be a general term for a displacement term related to the displacement of the sprung structure, a velocity term related to the velocity of the sprung structure, and an acceleration term related to the acceleration of the sprung structure. The normal vibration damping control includes feedback control (hereinafter abbreviated as "FB control") based on the skyhook control law for reducing vibration of the sprung structure (seat 2).

In the FB control, the controller 5 controls the actuator 33 to generate a control force according to the required controlled variable required to reduce the vibration of the seat 2. As an example, the controller 5 determines, based on the state information, a required vertical controlled variable $F_z$ for reducing vertical vibration, a required roll controlled variable $M_r$ for reducing roll vibration, and a required pitch controlled variable $M_p$ for reducing pitch vibration.

The controller 5 calculates the vertical acceleration Z", the roll acceleration Φ", and the pitch acceleration Θ" at the center of gravity of the seat 2 (seat member 21) based on the detection results of the acceleration sensors 41 to 43. The controller 5 obtains a first-order time integral value of each calculated acceleration to calculate the vertical velocity Z', roll velocity Φ', and pitch velocity Θ'. The controller 5 also obtains a first-order time integral value of each calculated velocity to calculate the vertical displacement Z, the roll angle displacement (roll angle) Φ, and the pitch angle displacement (pitch angle) Θ. The controller 5 calculates each required controlled variable using equations (1) to (3) below.

$$F_z = G1_z \cdot Z + G2_z \cdot Z' + G3_z \cdot Z'' \tag{1}$$

$$M_r = G1_r \cdot \Phi + G2_r \cdot \Phi' + G3_r \cdot \Phi'' \tag{2}$$

$$M_p = G1_p \cdot \Theta + G2_p \cdot \Theta' + G3_p \cdot \Theta'' \tag{3}$$

The required vertical controlled variable $F_z$ includes a displacement term that is the product of a vertical displacement Z and a gain $G1_z$, a velocity term that is the product of a vertical velocity Z' and a gain $G2_z$, and an acceleration term that is the product of a vertical acceleration Z" and a gain $G3_z$. The required roll controlled variable $M_r$ includes a displacement term that is the product of a roll angle Φ and a gain $G1_r$, a velocity term that is the product of a roll velocity Φ' and a gain $G2_r$, and an acceleration term that is the product of a roll acceleration Φ" and a gain $G3_r$. The required pitch controlled variable $M_p$ includes a displacement term that is the product of a pitch angle Θ and a gain $G1_p$, a velocity term that is the product of a pitch velocity Θ' and a gain $G2_p$, and an acceleration term that is the product of a pitch acceleration Θ" and a gain $G3_p$. In normal damping control, each of gain $G1_z$, $G2_z$, $G3_z$, $G1_r$, $G2_r$, $G3_r$, $G1_p$, $G2_p$, and $G3_p$ is set to its basic value. For example, the basic value is set to a different value for each control term.

In head care control, for each required controlled variable $F_z$, $M_r$, $M_p$, the gain $G2_z$, $G2_r$, $G2_p$ of the velocity term is set to a value larger than its basic value, and the gain $G3_z$, $G3_r$, $G3_p$ of the acceleration term is set to a value smaller than its basic value. In the internal organ care control, for each required controlled variable $F_z$, $M_r$, $M_p$, the gain $G2_z$, $G2_r$, $G2_p$ of the velocity term is set to a value smaller than its basic value, and the gain $G3_z$, $G3_r$, $G3_p$ of the acceleration term is set to a value smaller than their basic values. Note that when the occupant is seated on the seat 2, it is considered that the effects of roll vibration and pitch vibration are relatively large on the occupant's head. Therefore, in the head care control or the internal organ care control, such gain settings may be changed only for the required roll controlled variable $M_r$ and the required pitch controlled variable $M_p$. Further, the gain setting change as described above may be performed for at least one of all the required controlled variables $F_z$, $M_r$, and $M_p$.

The gain of the velocity term in the head care control is larger than the gain of the velocity term in the normal vibration damping control and the gain of the velocity term in the internal organ care control (relationship among the velocity term gains: head care control>normal vibration damping control>internal organ care control). The gain of the acceleration term in the head care control is smaller than the gain of the acceleration term in the normal vibration damping control and the gain of the acceleration term in the internal organ care control (relationship among the acceleration term gains: head care control<normal vibration damping control<internal organ care control).

In FB control using the skyhook control law, when the gain of the velocity term is increased, vibrations related to head resonance decrease, but vibrations related to internal organ resonance increase. Therefore, when the affected area is the head, the controller 5 increases the gain of the velocity term in each required controlled variable. When the affected area is an internal organ, the controller 5 reduces the gain of the velocity term in each required controlled variable. Conversely, when the gain of the acceleration term in FB control is increased, vibrations related to internal organ resonance will decrease, but vibrations related to head resonance will increase. Therefore, when the affected area is the head, the controller 5 reduces the gain of the acceleration term in each required controlled variable. When the affected area is an internal organ, the controller 5 increases the gain of the acceleration term in each required controlled variable. In this way, the controller 5 performs abnormal vibration damping control depending on the affected area.

Figures 3, 4:
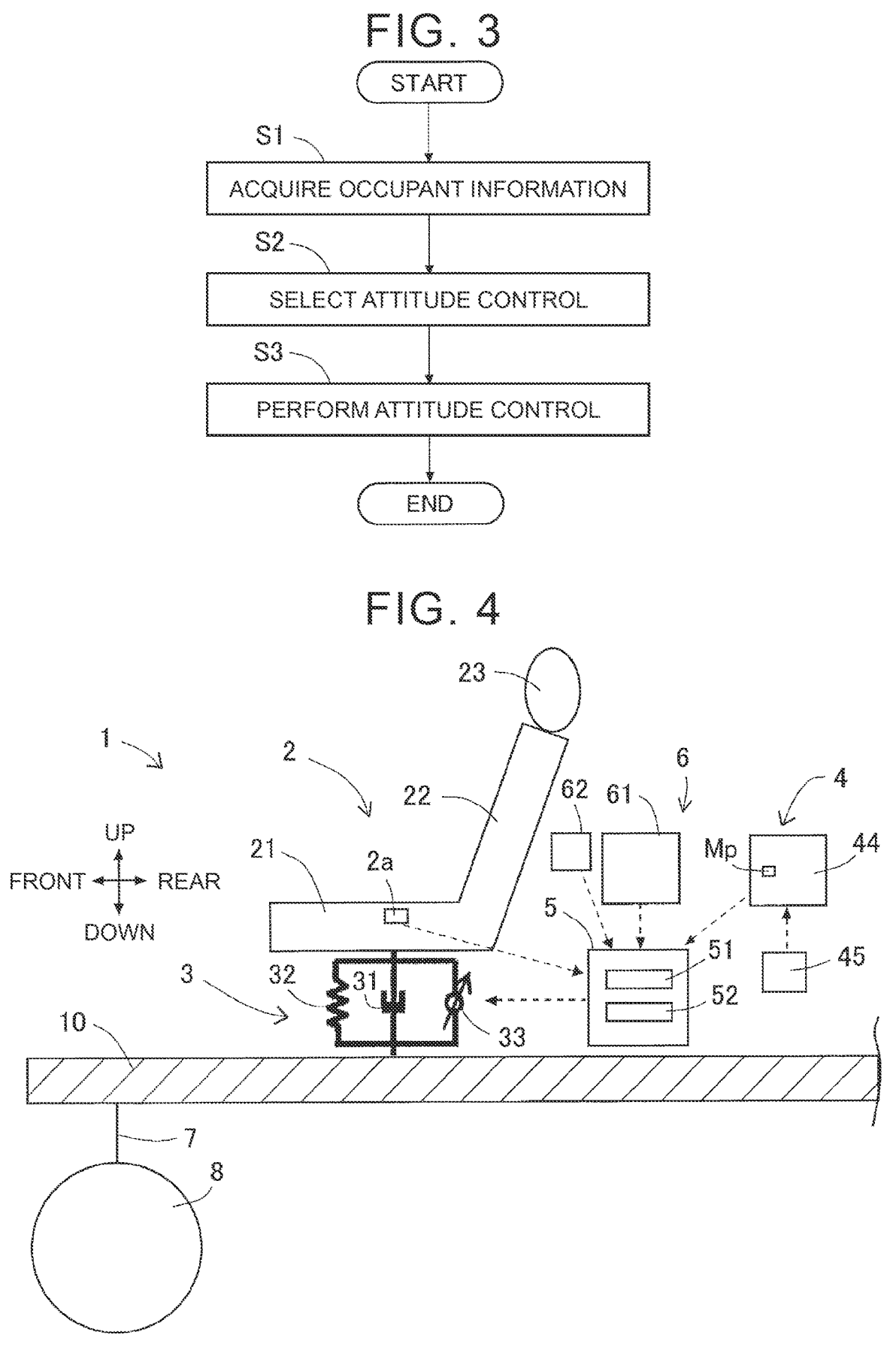

As shown in FIG. 3, the controller 5 acquires occupant information via the input terminal 61 (S1). The controller 5 selects the attitude control to be performed from preset attitude controls (for example, normal vibration damping control, head care control, and internal organ care control) based on the occupant information (S2). The controller 5 performs the selected attitude control based on the state information (S3).

To summarize the vehicle control device 1 of this embodiment, the controller 5 corrects the controlled variable (required controlled variable) of the seat attitude by the active suspension 3 based on the state information and occupant information. The occupant information acquisition device 6 acquires information on an affected area, namely an abnormal part of the occupant's body. The controller 5 calculates a controlled variable (required controlled variable) for the active suspension 3 in at least one of the vertical direction, roll direction, and pitch direction based on the state information. The controlled variable (required controlled variable) has a plurality of control terms including gains in the arithmetic expression. When there is an abnormality in the body of the occupant, the controller 5 corrects the gain of at least one control term based on the affected area.

When there is no abnormality in the body of the occupant (when it is determined that there is no abnormality based on the occupant information), the controller 5 sets each gain to a basic value (also referred to as an initial value) corresponding to the control term. When there is an abnormality in the body of the occupant (when it is determined that there is an abnormality based on the occupant information), the controller 5 makes the gain of one control term larger than the corresponding basic value based on the affected area, and makes the gain of the other control term smaller than the corresponding basic value.

More specifically, the controlled variable (required controlled variable) includes, as control terms, a displacement term that is the product of the displacement of the seat 2 and the gain, a velocity term that is the product of the velocity of the seat 2 and the gain, and an acceleration term that is the product of the acceleration of the seat 2 and the gain. When the affected area is the head, the controller 5 makes the gain of the velocity term larger than the corresponding basic value, and makes the gain of the acceleration term smaller than the corresponding basic value. When the affected area is an internal organ, the controller 5 makes the gain of the velocity term smaller than the corresponding basic value, and makes the gain of the acceleration term larger than the corresponding basic value.

According to this embodiment, the controlled variable (required controlled variable) is corrected based on occupant information. Therefore, attitude control can be performed depending on the occupant's physical condition and the presence or absence of injury. Since the gain of the control term is corrected based on the affected area, it becomes possible to perform attitude control suitable for the affected area, for example, to reduce vibrations in the resonance frequency band of the affected area. The preset abnormal vibration damping control described above is just one example, and various abnormal vibration damping controls can be set based on knowledge regarding the affected area and/or pathology.

Others

The present disclosure is not limited to the above embodiments. For example, the state detection device 4 may include a device that detects information (road surface information) about the road surface on which the target wheel is scheduled to travel. The road surface information includes, for example, vertical displacement of the road surface, velocity (time differential value of displacement), and/or acceleration (time differential value of velocity). That is, the road surface information is information related to vertical displacement of the road surface on which the vehicle is scheduled to travel. The target wheels can be set as appropriate.

As an example, the state detection device 4 includes an ECU 44 and a Global Navigation Satellite System (GNSS) receiver 45, as shown in FIG. 4. The memory of the ECU 44 stores a road surface information map Mp that includes map information and road surface information associated with the map information. The ECU 44 can detect the unsprung state quantity when the vehicle has traveled X meters or after t seconds, based on the traveling direction, the road surface information map Mp, and the position information of the own vehicle. The acceleration applied to the seat 2 can be calculated based on the unsprung state quantity.

In this way, the state detection device 4 may detect information (state information) regarding future acceleration applied to the seat 2. The controller 5 can perform normal attitude control or abnormal vibration damping control (for example, head care control, internal organ care control) based on this state information. Since the controller 5 can grasp the future controlled variable in advance through such preview damping control, it can set the control law and/or gain adapted to the road surface and occupant information in advance. Note that the ECU 44 may be a common ECU with the controller 5. Further, the road surface information may be a detection result of a surrounding monitoring device including a camera and/or a lidar (LiDAR: Light Detection and Ranging, or Laser Imaging Detection and Ranging). That is, the state detection device 4 may include a surrounding monitoring device. The controller 5 may detect road surface irregularities and the like and calculate predicted values (state information) based on the detection results of the surrounding monitoring device.

When an autonomous driving control is in operation, the controller 5 can acquire information on future turning and acceleration/deceleration from, for example, the automatic driving ECU according to the target route and the like. The controller 5 can calculate information (state information) regarding future acceleration applied to the seat 2 based on this information regarding turning and acceleration/deceleration. By using this information, the controller 5 can perform normal attitude control or abnormal vibration damping control (for example, head care control, internal organ care control) at appropriate timing.

Further, as shown in FIG. 4, the occupant information acquisition device 6 may include an image sensor 62 that detects the situation inside the vehicle. The image sensor 62 can detect the condition of the occupant, for example, the occupant's position, the occupant's attitude, the occupant's gestures, and whether or not a medical device such as a bandage or cast is worn. According to the detection result of the image sensor 62, the controller 5 can recognize the position of the seat 2 where the occupant is seated. For example, when the occupant makes a preset gesture to the image sensor 62, the image sensor 62 detects the gesture and sends information on the affected area and/or medical condition associated with the gesture to the controller 5. For example, when the image sensor 62 detects that a cast is attached to the arm of the occupant, the controller 5 may be set to determine that the affected area is the arm. The controller 5 may determine the affected area and/or the medical condition based on the detection result of the image sensor 62, and may correct the controlled variable of the carrier member attitude (carrier attitude) based on the determination result. Further, the controller 5 may select the vibration damping control to be performed from preset vibration damping controls (hereinafter also referred to as preset control) based on the above determination result based on the image sensor 62.

Further, when the attitude of the occupant is detected by the image sensor 62, the controller 5 may adjust the control law and/or gain of the damping control selected from the preset control based on the attitude of the occupant. For example, when the occupant is in a sleeping attitude, it is considered better to reduce vibrations in the roll direction and pitch direction than vibrations in the vertical direction in order to improve the comfort of the occupant. Therefore, when the occupant is in a sleeping attitude, the controller 5 may control the controlled variable (gain) in the roll direction and/or pitch direction to be larger than the set value in the damping control selected from the preset control.

Figure 5:
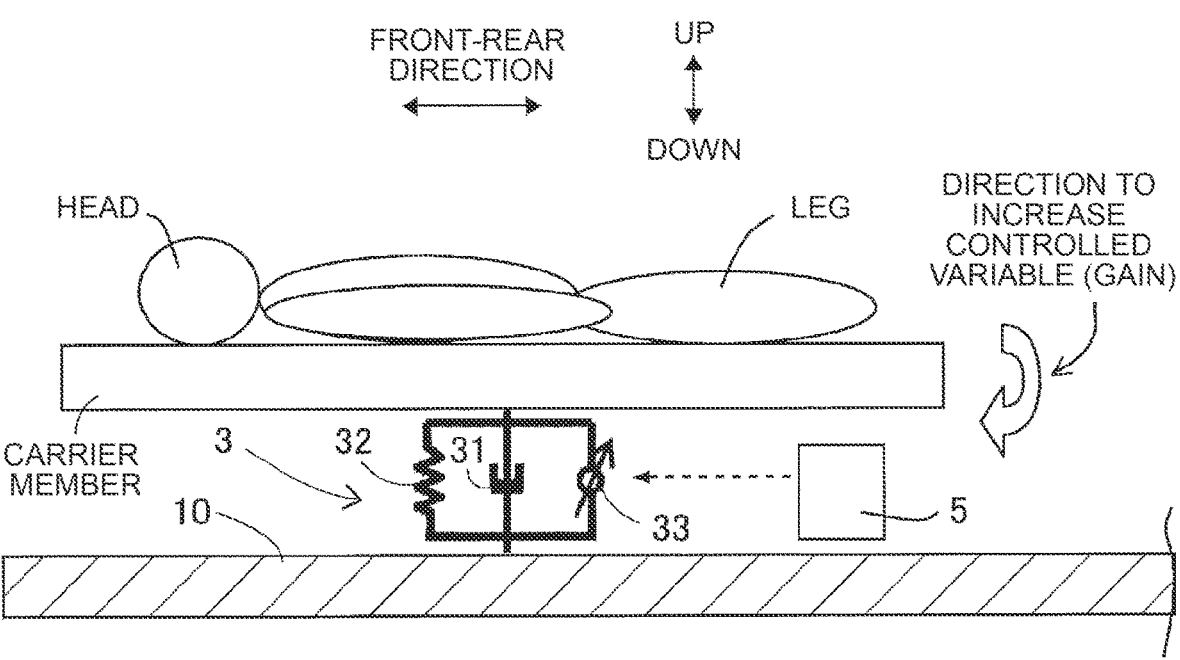
FIG. 5 is a conceptual diagram illustrating an example of control in the pitch direction according to the embodiment.

Further, when the occupant is in a sleeping attitude, it is desirable to reduce vibrations that cause the occupant's head to move downward, since this causes blood to rise to the head and deteriorates comfort. Therefore, when the occupant is in a sleeping attitude and when the carrier member tilts to one side in the pitch direction, the head moves downward, the controller 5 controls the other side in the pitch direction in the selected vibration damping control. Increase the controlled variable (gain). That is, as shown in FIG. 5, the controller 5 increases the controlled variable on the side where the head moves upward in the pitch direction (for example, compared to the opposite side). In other words, the controller 5 increases the damping effect (for example, compared to the opposite side) against vibrations in which the head moves downward in the pitch direction. The controller 5 increases the gain on one side in the pitch direction to a value larger than its set value (basic value) when the head of the occupant in a sleeping attitude is located on the front side in the direction of travel in the front-rear direction with respect to the legs. On the other hand, when the head of the occupant in a sleeping attitude is not located on the front side in the direction of travel in the front-rear direction with respect to the legs, the controller 5 increases the gain on the other side in the pitch direction to a value larger than its set value (basic value). Furthermore, the movement of blood within the body due to inertia when the vehicle decelerates may also deteriorate the comfort of the occupant. For example, when a vehicle decelerates (brakes) while moving forward, blood tends to move forward due to inertial force, which may reduce comfort if the head is relatively forward. However, by increasing the controlled variable on one side of the pitch direction so that the part of the carrier member that is located the side where the head is located in the front-rear direction of the carrier member faces upward at the timing of deceleration, movement of the blood toward the head due to inertial force is reduced, and the occupant's comfort is maintained. In this way, the controller 5 may correct the controlled variable in a specific direction depending on the occupant's attitude (for example, whether the occupant is a sleeping attitude, the position of the head, etc.).

The controller 5 may acquire the determination factor of the occupant's attitude from the image sensor 62 or from an angle sensor (not shown) that detects the backrest angle of the seat 2, for example. The controller 5 may determine that the occupant is in a sleeping attitude when the backrest angle of the seat 2 is less than a threshold value.

Further, when the carrier member is a bed or a stretcher frame, it can be estimated that the occupant is in a sleeping attitude. For this reason, the controller 5 may determine the presence or absence of an occupant on the carrier member based on information from the input terminal 61, the occupant detection sensor, or the image sensor 62, for example, assuming that the occupant is in a sleeping attitude. In this case, the controller 5 may further determine the position of the occupant's head based on information from the input terminal 61 or the image sensor 62, for example. For example, when the carrier member is an ambulance bed, the affected area, medical condition, and/or attitude (for example, the position of the head) of the occupant may be input from the input terminal 61 by, for example, an emergency worker. In this way, the controller 5 may recognize not only the affected area but also the occupant's attitude based on the detection results from the occupant information acquisition device 6 (for example, the image sensor 62, the input terminal 61, and/or the angle sensor), and correct the controlled variable according to the occupant's attitude. In other words, the controller 5 may correct the controlled variable of the carrier attitude depending on the abnormality (affected area) and attitude of the occupant.

A preset control may be set in the controller 5 for each set of affected area and attitude. The preset control includes, for example, a sitting attitude version, a sleeping attitude version (unknown head position version), a sleeping attitude and head forward version, and a sleeping attitude and head rearward version for each of the normal vibration damping control, the head care control, and the internal organ care control.

Moreover, the controller 5 may be configured by a plurality of ECUs. Further, the term "ECU" in the present disclosure is synonymous with "computer" and can be replaced with "computer". The "controlled variable" in the description can be replaced with "gain". Furthermore, "the controller 5 switching the attitude control from the normal vibration damping control to the abnormal vibration damping control" is included in the concept of "the controller 5 correcting the controlled variable of the normal vibration damping control". Further, the controller 5 may adjust the correction amount or switch control depending on the difference in the medical condition (for example, headache and head trauma) even if the affected area is the same. The carrier member may be a floor member.

What is claimed is:

1. A vehicle control device comprising:
a carrier member that is mounted in a vehicle so as to be movable relative to a vehicle body and on which an occupant sits or lies;
an active suspension disposed between the carrier member and the vehicle body and configured to change a carrier attitude that is a relative attitude of the carrier member with respect to the vehicle body;
a state detection device configured to detect state information that is information on current or future acceleration applied to the carrier member;
a controller configured to control the active suspension based on the state information to change the carrier attitude; and
an occupant information acquisition device configured to acquire occupant information that is information on an affected area that is an abnormal part of the body of the occupant on the carrier member, wherein;
the controller is configured to calculate a controlled variable in at least one of following directions for the active suspension based on the state information: a vertical direction, a roll direction, and a pitch direction;
the controlled variable includes in an arithmetic expression a plurality of control terms each including a gain; and
the controller is configured to correct the gain of at least one of the control terms based on the affected area when there is the abnormality in the body of the occupant.

2. The vehicle control device according to claim 1, wherein the controller is configured to
set each gain to a basic value corresponding to the control term when there is no abnormality in the body of the occupant, and
when there is the abnormality in the body of the occupant, set the gain of one of the control terms to a value larger than a corresponding one of the basic values, and set the gain of another one of the control terms to a value smaller than a corresponding one of the basic values, based on the affected area.

3. The vehicle control device according to claim 2, wherein:
the controlled variable includes, as the control terms, a displacement term that is a product of a displacement of the carrier member and the gain, a velocity term that is a product of a velocity of the carrier member and the gain, and an acceleration term that is a product of an acceleration of the carrier member and the gain; and
the controller is configured to, when the affected area is a head, set the gain of the velocity term to a value larger than a corresponding one of the basic values, and set the gain of the acceleration term to a value smaller than a corresponding one of the basic values.

4. The vehicle control device according to claim 2, wherein:
the controlled variable includes, as the control terms, a displacement term that is a product of a displacement of the carrier member and the gain, a velocity term that is a product of a velocity of the carrier member and the gain, and an acceleration term that is a product of an acceleration of the carrier member and the gain; and
the controller is configured to, when the affected area is an internal organ, set the gain of the velocity term to a value smaller than a corresponding one of the basic values, and set the gain of the acceleration term to a value larger than a corresponding one of the basic values.

* * * * *